United States Patent
Honda et al.

(10) Patent No.: US 10,811,654 B2
(45) Date of Patent: Oct. 20, 2020

(54) SEPARATOR FOR NON-AQUEOUS SECONDARY BATTERY AND NON-AQUEOUS SECONDARY BATTERY

(71) Applicant: TEIJIN LIMITED, Osaka-shi, Osaka (JP)

(72) Inventors: Susumu Honda, Osaka (JP); Satoshi Nishikawa, Osaka (JP); Takashi Yoshitomi, Osaka (JP); Rika Kuratani, Osaka (JP)

(73) Assignee: TEIJIN LIMITED, Osaka (JP)

( * ) Notice: Subject to any disclaimer, the term of this patent is extended or adjusted under 35 U.S.C. 154(b) by 115 days.

(21) Appl. No.: 15/774,723

(22) PCT Filed: Nov. 8, 2016

(86) PCT No.: PCT/JP2016/083139
§ 371 (c)(1),
(2) Date: May 9, 2018

(87) PCT Pub. No.: WO2017/082261
PCT Pub. Date: May 18, 2017

(65) Prior Publication Data
US 2018/0331342 A1 Nov. 15, 2018

(30) Foreign Application Priority Data

Nov. 11, 2015 (JP) ................................ 2015-221600
Nov. 11, 2015 (JP) ................................ 2015-221601
Nov. 11, 2015 (JP) ................................ 2015-221602
Dec. 1, 2015 (JP) ................................ 2015-234796

(51) Int. Cl.
*H01M 2/16* (2006.01)
*H01M 2/12* (2006.01)
*H01M 2/10* (2006.01)
*H01M 10/05* (2010.01)
*H01M 10/0525* (2010.01)

(52) U.S. Cl.
CPC ........... *H01M 2/1653* (2013.01); *H01M 2/16* (2013.01); *H01M 2/1686* (2013.01); *H01M 10/05* (2013.01); *H01M 10/0525* (2013.01)

(58) Field of Classification Search
CPC ............ H01M 2/16; H01M 2/12; H01M 2/10
See application file for complete search history.

(56) References Cited

U.S. PATENT DOCUMENTS

| | | | | |
|---|---|---|---|---|
| 2003/0114614 A1* | 6/2003 | Wille | ................... | C08F 214/22 526/247 |
| 2006/0216609 A1* | 9/2006 | Abe | ..................... | H01M 4/13 429/246 |
| 2010/0255380 A1* | 10/2010 | Baba | ................... | H01M 2/145 429/246 |
| 2012/0115009 A1 | 5/2012 | Okuno et al. | | |
| 2012/0268072 A1 | 10/2012 | Okuno | | |
| 2014/0054496 A1* | 2/2014 | Hanasaki | ............... | H01M 4/622 252/182.1 |
| 2014/0255754 A1* | 9/2014 | Nishikawa | ............ | H01M 2/027 429/145 |
| 2014/0308567 A1 | 10/2014 | Nishikawa et al. | | |
| 2015/0140423 A1* | 5/2015 | Brown | ................ | H01M 4/0404 429/213 |

FOREIGN PATENT DOCUMENTS

| | | |
|---|---|---|
| CN | 102468465 A | 5/2012 |
| EP | 3200257 A1 | 8/2017 |
| JP | 4127989 B2 | 7/2008 |
| JP | 2011-192620 A | 9/2011 |
| JP | 2012-104291 A | 5/2012 |
| JP | 2014-041818 A | 3/2014 |
| JP | 2014-165005 A | 9/2014 |
| KR | 10-2014-0056390 A | 5/2014 |
| WO | 2013/058371 A1 | 4/2013 |
| WO | 2014/021290 A1 | 2/2014 |
| WO | 2014/021293 A1 | 2/2014 |

OTHER PUBLICATIONS

Notice of Reasons for Rejection for JP 2017-514709 dated May 16, 2017.
International Search Report for PCT/JP2016/083139 dated Feb. 7, 2017.
Communication dated Oct. 15, 2018, from European Patent Office in counterpart application No. 16864222.1.

* cited by examiner

*Primary Examiner* — Kenneth J Douyette
(74) *Attorney, Agent, or Firm* — Sughrue Mion, PLLC

(57) ABSTRACT

A separator for a non-aqueous secondary battery, containing a porous substrate, and an adhesive porous layer that is provided on one side or both sides of the porous substrate, in which the adhesive porous layer contains a polyvinylidene fluoride type resin including a vinylidene fluoride monomer unit and a hexafluoropropylene monomer unit, and the polyvinylidene fluoride type resin has an acid value of from 3.0 mgKOH/g to 20 mgKOH/g.

7 Claims, No Drawings

SEPARATOR FOR NON-AQUEOUS SECONDARY BATTERY AND NON-AQUEOUS SECONDARY BATTERY

CROSS REFERENCE TO RELATED APPLICATIONS

This application is a National Stage of International Application No. PCT/JP2016/083139 filed Nov. 8, 2016, claiming priority based on Japanese Patent Application Nos. 2015-221600, 2015-221601 and 2015-221602 filed Nov. 11, 2015 and Japanese Patent Application No. 2015-234796 filed Dec. 1, 2015.

TECHNICAL FIELD

The present invention relates to a separator for a non-aqueous secondary battery and a non-aqueous secondary battery.

BACKGROUND ART

Non-aqueous secondary batteries represented by lithium ion secondary batteries are widely used as power sources for portable electronic devices such as notebook-size personal computers, mobile phones, digital cameras and camcorders. Outer package of non-aqueous secondary batteries has been lightened with size reduction and weight reduction of portable electronic devices, and as outer packaging materials, aluminum cans have been developed in place of stainless cans, and further, aluminum laminated film packages have been developed in place of metallic cans. However, an aluminum laminated film package is soft, and therefore in a battery having the package as an outer packaging material (a so called soft package battery), a gap is easily formed between an electrode and a separator due to external impact, or electrode expansion and shrinkage associated with charge-discharge, so that the cycle life of the battery may be reduced.

In order to solve the above problems, a technique to increase adhesion between an electrode and a separator has been suggested. As one of the techniques, a separator having an adhesive porous layer containing a polyvinylidene fluoride type resin on a polyolefin microporous film is known (for example, patent documents 1 to 5). When this separator is superimposed and thermally pressed on an electrode with an electrolyte solution included therein, it is well adhered to the electrode through the adhesive porous layer, thereby improving the cycle life of a soft pack battery.

PRIOR ART DOCUMENTS

Patent Documents

Patent Document 1: Japanese Patent No. 4127989
Patent Document 2: International Publication No. 2014/021293
Patent Document 3: International Publication No. 2013/058371
Patent Document 4: International Publication No. 2014/021290
Patent Document 5: Japanese Patent Application Laid-Open (JP-A) No. 2014-41818

SUMMARY OF INVENTION

Technical Problem

Recently, for a non-aqueous secondary battery represented by a lithium ion secondary battery, an application thereof as a battery for electric power storage or electric vehicles is being reviewed due to the property of a high energy density thereof. When using the non-aqueous secondary battery for electric power storage or electric vehicles, it is intended to have a larger area, and thus, as a soft pack battery has a larger area, even a separator having an adhesive porous layer containing polyvinylidene fluoride type resin lacks adhesion between an electrode and the separator, so that a reduced battery capacity, deteriorated charge-discharge characteristics, battery expansion and the like may occur. As the battery has a larger area, it is required that the adhesiveness of the adhesive porous layer to the electrode is improved.

In addition, since it is required for the non-aqueous secondary battery to have additional higher capacity and higher energy density, a negative electrode containing an aqueous binder has been widely used, and the adhesive porous layer containing a polyvinylidene fluoride type resin is required to have adhesiveness to the negative electrode containing an aqueous binder.

However, the battery using the separator having an adhesive porous layer containing a polyvinylidene fluoride type resin is generally manufactured by preparing a laminate of an electrode and a separator, housing this laminate in an exterior material to inject an electrolyte solution, and subjecting this laminate in a wet state with the electrolyte solution to thermal press treatment (referred to as "a wet heat press" herein). By the wet heat press, the polyvinylidene fluoride type resin is thermally pressed in a swollen state in the electrolyte solution, thereby having good adhesion between an electrode and a separator, so that good battery characteristics may be easily obtained.

However, when performing the wet heat press at relatively high temperature, sometimes an electrolyte solution and an electrolyte are decomposed to produce gas in the battery, thereby expanding the battery. In particular, where the battery has a larger area by a jelly roll battery, or internal stress remaining in the separator is high, this phenomenon is more likely to occur.

In addition, when the laminate is left without being transferred to a wet heat press process, the laminate is sometimes deformed, depending on an internal stress difference between the electrode and the separator, a size of the laminate, the winding condition of the laminate, and the like, thereby increasing the thickness, and this phenomenon causes a production yield of the battery to be decreased.

Meanwhile, there is a technique for bonding an electrode and a separator by carrying out thermal press treatment without impregnating the laminate of the electrode and the separator in an electrolyte solution (referred to as "a dry heat press" herein). When the electrode and the separator are sufficiently bonded by the dry heat press, the wet heat press is not needed, and thus, decomposition of an electrolyte solution and an electrolyte does not occur.

In addition, even in the case of carrying out the wet heat press, when the dry heat press is previously carried out on the laminate to bond the electrode and the separator, the temperature of wet heat press may be set relatively low, thereby suppressing the decomposition of the electrolyte solution and the electrolyte. Moreover, when the separator is adhered to the electrode by the dry heat press before housing the laminate in the exterior material, deformation of the laminate which may occur when returning the laminate for housing it in the exterior material may be suppressed.

Accordingly, where the separator is well adhered to the electrode by the dry heat press, it is expected that the battery having a larger area may be efficiently manufactured.

An embodiment of the present disclosure was made under the above circumstances.

An embodiment of the present disclosure is intended to provide a separator including an adhesive porous layer containing a polyvinylidene fluoride type resin, which is a separator for a non-aqueous secondary battery, having excellent adhesiveness to an electrode by any of a wet heat press or a dry heat press.

Further, another embodiment of the present disclosure is intended to provide a non-aqueous secondary battery with high productivity.

Solution to Problem

The specific solutions to the problem include the following embodiments:

[1] A separator for a non-aqueous secondary battery, containing:
a porous substrate; and
an adhesive porous layer that is provided on one side or both sides of the porous substrate,
wherein the adhesive porous layer contains a polyvinylidene fluoride type resin including a vinylidene fluoride monomer unit and a hexafluoropropylene monomer unit, and the polyvinylidene fluoride type resin has an acid value of from 3.0 mgKOH/g to 20 mgKOH/g.

[2] The separator for a non-aqueous secondary battery of [1], wherein the polyvinylidene fluoride type resin contains the hexafluoropropylene monomer unit in a range of from 0.1 mol % to 10 mol % with respect to a total amount of the vinylidene fluoride monomer unit and the hexafluoropropylene monomer unit.

[3] The separator for a non-aqueous secondary battery of [1] or [2], wherein a weight-average molecular weight of the polyvinylidene fluoride type resin is from 300,000 to 3,000,000.

[4] The separator for a non-aqueous secondary battery according to any of [1] to [3], wherein the adhesive porous layer further contains a filler.

[5] A non-aqueous secondary battery, containing:
a positive electrode.
a negative electrode, and
the separator for a non-aqueous secondary battery according to any of [1] to [4], disposed between the positive electrode and the negative electrode, wherein an electromotive force is obtained by lithium doping and dedoping.

Advantageous Effects of Invention

According to an embodiment of the present disclosure, a separator including an adhesive porous layer containing a polyvinylidene fluoride type resin, which is a separator for a non-aqueous secondary battery having excellent adhesiveness to an electrode by any of a wet heat press or a dry heat press is provided.

In addition, according to another embodiment of the present disclosure, a non-aqueous secondary battery is provided with high productivity.

DESCRIPTION OF EMBODIMENTS

Hereinafter, the embodiments will be described. Further, the description and the Examples thereof illustrate the embodiments, but do not limit the scope of the embodiments.

In the present disclosure, the numerical range denoted by using "to" represents the range inclusive of the number written before and after "to" as the minimum and maximum values.

In the present disclosure, the term "process" includes not only an independent process, but also the process which is not clearly distinguished from other processes but achieves the desired purpose thereof.

For the separator of the present disclosure, "a longitudinal direction" refers to the longitudinal direction of a porous substrate and a separator manufactured in a long shape, and "a width direction" refers to a direction orthogonal to "the longitudinal direction". "The longitudinal direction" also refers to a "MD direction", and "the width direction" also refers to a "TD direction".

In the present disclosure, "a monomer unit" of the polyvinylidene fluoride type resin refers to a constituent unit of a polyvinylidene fluoride type resin, which is formed by polymerizing monomers.

<Separator for Non-Aqueous Secondary Battery>

The separator for a non-aqueous secondary battery of the present disclosure (also referred to as simply "separator") includes a porous substrate; and an adhesive porous layer that is provided on one side or both sides of the porous substrate. In the separator of the present disclosure, the adhesive porous layer contains a polyvinylidene fluoride type resin which includes a vinylidene fluoride monomer unit and a hexafluoropropylene monomer unit, and has an acid value of from 3.0 mgKOH/g to 20 mgKOH/g.

Hereinafter, the vinylidene fluoride monomer unit is also referred to as "VDF unit", the hexafluoropropylene monomer unit is also referred to as "HFP unit", and the polyvinylidene fluoride type resin having the VDF unit and the HFP unit (which may have another monomer unit) is also referred to as "VDF-HFP copolymer".

In the present disclosure, the acid value of the VDF-HFP copolymer included in the adhesive porous layer is obtained by extracting the VDF-HFP copolymer included in the adhesive porous layer, and measuring the acid value thereof by a potentiometric titration method (JIS K1557-5:2007). Otherwise, the acid value of the VDF-HFP copolymer included in the adhesive porous layer is obtained by measuring the acid value of the VDF-HFP copolymer used in formation of the adhesive porous layer by a potentiometric titration method (JIS K1557-5:2007).

The separator of the present disclosure has excellent adhesion to the electrode by any of the wet heat press or the dry heat press. The reason therefor is presumed as follows.

Since the polyvinylidene fluoride type resin has crystallinity and thermal resistance within an appropriate range by copolymerizing the hexafluoropropylene with the vinylidene fluoride, the adhesive porous layer containing the VDF-HFP copolymer is properly softened when thermally pressing it with the electrode, thereby having excellent adhesion to the electrode. Therefore, it is considered that the separator of the present disclosure has excellent adhesion to the electrode by any of the wet heat press or the dry heat press, as compared with the case that the adhesive porous layer does not contain the VDF-HFP copolymer, but contains another polyvinylidene fluoride type resin (that is, the polyvinylidene fluoride type resin without the HFP unit).

However, since the VDF-HFP copolymer swells in an electrolyte solution, the adhesive porous layer containing the VDF-HFP copolymer is more likely to have attenuated adhesion even in the case of adhering it to the electrode by the dry heat press, when impregnated with the electrolyte solution. The adhesive porous layer containing the VDF- HFP copolymer having an acid value of from 3.0 mgKOH/g to 20 mgKOH/g refers to the adhesive porous layer including an acidic group (preferably carboxyl group) to some extent, and it is considered that the acidic group (preferably carboxyl group) interacts with an electrode active material to increase the adhesion between the adhesive porous layer and the electrode. That is, where the VDF-HFP copolymer has the acid value of 3.0 mgKOH/g or more, it is considered that the adhesion between the separator and the electrode is likely to be maintained even in the case of impregnation with the electrolyte solution after the dry heat press, and also, the wet heat press is further carried out after impregnation with the electrolyte solution, thereby recovering the adhesion between the separator and the electrode. In this regard, the VDF-HFP copolymer has an acid value of 3.0 mgKOH/g or more, more preferably 5.0 mgKOH/g or more, still more preferably 7.0 mgKOH/g or more or more.

From the viewpoint of the adhesiveness of the adhesive porous layer to the electrode, it is preferred that the acid value of the VDF-HFP copolymer is high, however, from the viewpoint of the oxidation resistance of the separator and the electrode, the acid value of the VDF-HFP copolymer is preferably 20 mgKOH/g or less, more preferably 15 mgKOH/g or less.

The separator of the present disclosure has excellent adhesion to the electrode using a water-based binder (specifically a styrene-butadiene copolymer), as well as to the electrode using a solvent-based binder (specifically a polyvinylidene fluoride type resin), by any of the wet heat press or the dry heat press.

According to the separator of the present disclosure having excellent adhesion to the electrode, the non-aqueous secondary battery may be efficiently manufactured. In addition, according to the separator of the present disclosure having excellent adhesion to the electrode, the uniformity of the reaction in the battery during charge or discharge of the battery becomes higher, thereby improving the battery performance of the non-aqueous secondary battery, in particular a soft pack battery.

In an embodiment of the separator of the present disclosure, the separator is well-adhered to the electrode, even by the thermal press at relatively low pressure and low temperature. As the thermal press condition has higher pressure and temperature, the porous structure of the adhesive porous layer is broken, and thus, according to an embodiment of the separator of the present disclosure, the thermal press condition may be relatively mild, and therefore, the ion permeability of the separator after adhesion is maintained to have excellent battery characteristics. In addition, according to an embodiment of the separator of the present disclosure, the temperature when performing the wet heat press may be set lower, thereby suppressing gas generation caused by the decomposition of the electrolyte solution and the electrolyte.

Hereinafter, the materials, composition, and physical properties of the separator of the present disclosure will be described in detail.

[Porous Substrate]

The porous substrate in the present disclosure refers to a substrate having pores or voids therein. As the substrate, a microporous film; a porous sheet such as non-woven fabric and paper, composed of a fibrous material; a composite porous sheet in which on a microporous film or a porous sheet, one or more of another porous layer are laminated; and the like may be listed. The microporous film refers to a film having plural micropores therein, having a structure in which these micropores are connected to each other, and allowing gas or liquid to pass from one surface to the other surface.

The porous substrate contains organic materials and/or inorganic materials, having electrical insulation.

It is preferred that the porous substrate contains a thermoplastic resin, from a viewpoint of imparting a shutdown function to the porous substrate. The shutdown function refers to a function of dissolving the material to clog the pores of the porous substrate, thereby blocking ionic migration, and preventing thermal runaway of a battery, when the battery temperature is raised. As the thermoplastic resin, a thermoplastic resin having a melting point less than 200° C. is preferred. As the thermoplastic resin, for example, polyesters such as polyethylene terephthalate; polyolefins such as polyethylene and polypropylene; and the like may be mentioned, and among them, polyolefins are preferred.

As the porous substrate, a microporous film containing polyolefin (referred to as "polyolefin microporous film") is preferred. As the polyolefin microporous film, for example, a polyolefin microporous film which is applied to the conventional separator for a non-aqueous secondary battery may be mentioned, and among them, it is preferred to select those having sufficient mechanical properties and ion permeability.

It is preferred that the polyolefin microporous film contains polyethylene, from the viewpoint of exhibiting the shutdown function, and the content of polyethylene is preferably 95% by mass or more with respect to the total mass of the polyolefin microporous film.

It is preferred that the polyolefin microporous film contains polyethylene and polypropylene, from the viewpoint of imparting thermal resistance to the extent that the film is not easily broken when exposed to a high temperature. As the polyolefin microporous film, a microporous film in which polyethylene and polypropylene are present in a mixed state in a layer may be listed. It is preferred that the microporous film contains 95% by mass or more of polyethylene and 5% by mass or less of polypropylene, from the viewpoint of compatibility of the shutdown function and thermal resistance. In addition, from the viewpoint of compatibility of the shutdown function and thermal resistance, a polyolefin microporous film having a lamination structure with two or more layers, in which at least one layer contains polyethylene and at least one layer contains polypropylene, is also preferred.

As the polyolefin contained in the polyolefin microporous film, a polyolefin having a weight-average molecular weight (Mw) of from 100,000 to 5,000,000 is preferred. In the case that the polyolefin has a Mw of 100,000 or more, sufficient mechanical properties may be secured. Meanwhile, the polyolefin has a Mw of 5,000.000 or less, the shutdown characteristic is good, and film molding is easy.

The polyolefin microporous film may be manufactured by, for example, the following methods. That is, the method is to extrude a molten polyolefin resin from a T-die to form a sheet, crystallize and elongate the sheet, and further subject the sheet to heat treatment, thereby obtaining a microporous film. Otherwise, the method is to extrude a polyolefin resin melted with a plasticizer such as liquid paraffin from a T-die, cool it to form a sheet, elongate the sheet, extract the plasticizer, and perform heat treatment, thereby obtaining a microporous film.

As the porous sheet composed of a fibrous material, non-woven fabric composed of fibrous materials such as polyesters such as polyethylene terephthalate; polyolefins such as polyethylene and polypropylene; thermal resistant resins such as aromatic polyamide, polyimide, polyethersulfone, polysulfone, polyetherketone and polyetherimide; and the like, or paper may be mentioned. Herein, the thermal resistant resin refers to a polymer having a melting point of 200° C. or higher, or a polymer having no melting point and a decomposition temperature of 200° C. or higher.

As the composite porous sheet, a sheet in which a functional layer is laminated on the microporous film or microporous sheet may be mentioned. This composite porous sheet is preferred since a further function may be added by the functional layer. As the functional layer, a porous layer containing a thermal resistant resin, or a porous layer containing a thermal resistant resin and an inorganic filler is preferred, from the viewpoint of imparting thermal resistance. As the thermal resistant resin, aromatic polyamides, polyimides, polyethersulfone, polysulfone, polyetherketones, polyetherimides and the like may be mentioned. As the inorganic filler, metal oxides such as alumina, metal hydroxides such as magnesium hydroxide, and the like may be mentioned. As the method of providing the functional layer on the microporous film or porous sheet, a method of coating the functional layer on the microporous film or porous sheet, a method of bonding the functional layer to the microporous film or porous sheet with an adhesive, a method, a method of thermocompressing a microporous film or porous sheet with the functional layer, and the like may be mentioned.

The porous substrate may be subjected to various surface treatments within the range of not impairing the nature of the porous substrate, for the purpose of improving wettability with the coating liquid for forming the adhesive porous layer. As the surface treatment, corona treatment, plasma treatment, flame treatment, UV irradiation treatment, and the like may be mentioned.

[Characteristics of Porous Substrate]

The porous substrate may have a thickness of, preferably from 3 μm to 25 μm, more preferably from 5 μm to 25 μm, still more preferably from 5 μm to 20 μm, from the viewpoint of obtaining good mechanical properties and internal resistance.

It is preferred that the porosity of the porous substrate is from 20 to 60%, from the viewpoint of obtaining proper film resistance or shutdown function.

The Gurley value of the porous substrate (JIS P8117: 2009) is preferably from 50 sec/100 cc to 800 sec/100 cc, more preferably from 50 sec/100 cc to 400 sec/100 cc, from the viewpoint of preventing short circuit a battery or obtaining sufficient ion permeability.

The piercing strength of the porous substrate is preferably 200 g or more, more preferably 300 g or more, from the viewpoint of improving a production yield. The piercing strength of the porous substrate is measured by performing a piercing test under the condition of a curvature radius of a needle tip of 0.5 mm, and a piercing speed of 2 mm/sec, using a KES-G5 handy compression tester from KATO TECH CO., LTD., to obtain a maximum piercing load (g).

It is preferred that the porous substrate has an average pore diameter of from 20 nm to 100 nm. When the porous substrate has an average pore diameter of 20 nm or more, ions are easily migrated, so that good battery performance is easily obtained. In this regard, the porous substrate has an average pore diameter of more preferably 30 nm or more, still more preferably 40 nm or more. Meanwhile when the porous substrate has an average pore diameter of 100 nm or less, peel strength between the porous substrate and the adhesive porous layer may be improved, and a good shutdown function may be exhibited. In this regard, the porous substrate may have an average pore diameter of more preferably 90 nm or less, still more preferably 80 nm or less. The average pore diameter of the porous substrate is a value measured using a Perm porosimeter, and for example, may be measured using a Penn porosimeter (available from PMI, CFP-1500-A), in accordance with ASTM E1294-89.

[Adhesive Porous Layer]

In the present disclosure, the adhesive porous layer is a porous layer that is provided on one side or both sides of the porous substrate, and contains the VDF-HFP copolymer having an acid value of from 3.0 mgKOH/g to 20 mgKOH/g.

The adhesive porous layer has plural fine pores therein, has a structure in which these fine pores are connected with each other, and allows gas or liquid to pass from one surface to the other surface.

The adhesive porous layer is a layer that is provided on one side or both sides of the porous substrate as an outermost layer of the separator, and may be adhered to the electrode when superimposing the separator and the electrode, and performing thermal press.

It is preferred that the adhesive porous layer is provided on both surfaces, rather than provided on only one surface of the porous substrate, from the viewpoint of having excellent cycle characteristics (capacity retention) of the battery. It is because when the adhesive porous layer is provided on both surfaces of the porous substrate, both surfaces of the separator may be well-adhered to both electrodes through the adhesive porous layer.

The adhesive porous layer contains at least the VDF-HFP copolymer having an acid value of from 3.0 mgKOH/g to 20 mgKOH/g. The adhesive porous layer may also contain another resin, filler or the like, in addition to the VDF-HFP copolymer.

[VDF-HFP Copolymer]

In the present disclosure, the VDF-HFP copolymer includes both of the copolymer including only the VDF unit and the HFP unit, and the copolymer including another monomer unit. The example of the monomer forming another monomer unit includes halogen-containing monomers such as tetrafluoroethylene, trifluoroethylene, chlorotrifluoroethylene, vinyl fluoride and trichloroethylene, monomers having a carboxyl group which are copolymerized for adjusting the acid value (e.g., (meth)acrylic acid, (meth) acrylic ester, maleic acid, anhydrous maleic acid, maleic ester, and a fluorine substituents thereof); and the like, and the monomer unit derived from one or two or more of these monomers may be included in the VDF-HFP copolymer.

It is preferred that the VDF-HFP copolymer has the VDF unit and the HFP unit among the halogen-containing monomer unit, as the main monomer unit. Specifically, the total amount of the VDF unit and the HFP unit included in the VDF-HFP copolymer is preferably 80 mol % or more, more preferably 90 mol % or more, still more preferably 100 mol %, with respect to the total amount of the halogen-containing monomer units. As the monomer unit included in the VDF-HFP copolymer, only the halogen-containing monomer units (preferably VDF unit and HFP unit) are preferred, in addition to the monomer contained for adjustment of the acid value.

The acid value of the VDF-HFP copolymer may be controlled by, for example, introducing a carboxyl group to the VDF-HFP copolymer. The introduction and introduced amount of the carboxyl group with respect to the VDF-HFP copolymer may be controlled by using monomers having a carboxyl group as a polymerization component of the VDF-HFP copolymer (e.g., (meth)acrylic acid, (meth)acrylic ester, maleic acid, anhydrous maleic acid, maleic ester, and a fluorine substituent thereof), and adjusting the polymerization ratio.

The lower limit of the acid value of the VDF-HFP copolymer is preferably 3.0 mgKOH/g or more, more preferably 5.0 mgKOH/g or more, still more preferably 7.0 mgKOH/g or more, and the upper limit thereof is preferably 20 mgKOH/g or less, more preferably 15 mgKOH/g or less.

It is preferred that the VDF-HFP copolymer includes the HFP unit in a proportion of from 0.1 mol % to 10 mol %, with respect to the total amount of the HFP unit and the VDF unit. When the proportion of the HFP unit is 0.1 mol % or more, since the motility of polymer chains during heating is high, the adhesive porous layer is more likely to be adhered to the electrode by the dry heat press, and also, since the adhesive porous layer more easily swells in the electrolyte solution, the adhesive porous layer is more likely to be adhered to the electrode by the wet heat press. In this regard, the proportion of the HFP unit is preferably 0.5 mol % or more, more preferably 1.0 mol % or more. Meanwhile, when the proportion of the HFP unit is 10 mol % or less, the VDF-HFP copolymer is difficult to be dissolved in the electrolyte solution. In this regard, it is preferred that the proportion of the HFP unit is 8 mol % or less.

It is preferred that the VDF-HFP copolymer has a weight-average molecular weight (Mw) of from 300,000 to 3,000,000. When the VDF-HFP copolymer has Mw of 300,000 or more, mechanical properties allowing the adhesive porous layer to withstand the adhesive treatment to the electrode may be secured, thereby having better adhesion to the electrode. In this regard, the VDF-HFP copolymer has Mw of preferably 500,000 or more, more preferably 800,000 or more, still more preferably 1,000,000 or more. Meanwhile, when the VDF-HFP copolymer has Mw of 3,000,000 or less, the viscosity of the coating liquid for coating and forming the adhesive porous layer is not unduly high, and thus, moldability and crystal formation are fine, and the porosity of the adhesive porous layer is good. In this regard, the VDF-HFP copolymer has Mw of more preferably 2,500,000 or less, still more preferably 2,000,000 or less.

The VDF-HFP copolymer may be obtained by, for example, emulsion-polymerizing or suspension-polymerizing vinylidene fluoride, hexafluoropropylene and other monomers.

[Resin Other than VDF-HFP Copolymer]

In the present disclosure, the adhesive porous layer may contain a polyvinylidene fluoride type resin other than the VDF-HFP copolymer, and the resins other than the polyvinylidene fluoride type resin.

The example of the polyvinylidene fluoride type resin other than the VDF-HFP copolymer may include a homopolymer of vinylidene fluoride (that is, polyvinylidene fluoride); and a copolymer of vinylidene fluoride with at least one selected from tetrafluoroethylene, trifluoroethylene, chlorotrifluoroethylene, vinyl fluoride, trichloroethylene and the like.

As the resin other than the polyvinylidene fluoride type resin, a homopolymer or copolymer of fluorine-based rubber, an acrylic resin, a styrene-butadiene copolymer and a vinylnitrile compound (acrylonitrile, methacrylonitrile, etc.), carboxymethyl cellulose, hydroxyalkyl cellulose, polyvinyl alcohol, polyvinyl butyral, polyvinyl pyrrolidone, polyether (polyethylene oxide, polypropylene oxide, etc.) and the like may be listed.

It is preferred that the binder resin included in the adhesive porous layer is the VDF-HFP copolymer having an acid value of from 3.0 mgKOH/g to 20 mgKOH/g. In an embodiment of the adhesive porous layer, the VDF-HFP copolymer having an acid value of from 3.0 mgKOH/g to 20 mgKOH/g may account for 95% by mass or more, or 97% by mass or more, or 99% by mass or more, or 100% by mass of the total amount of the resins included in the adhesive porous layer.

[Filler]

In the present disclosure, the adhesive porous layer may contain a filler of inorganic materials or organic materials, for the purpose of improving a sliding property or thermal resistance of the separator. In this case, the content or particle size thereof is preferably to the extent of not hindering the effect of the present disclosure.

In general, when the filler is included in the adhesive porous layer, the adhesion between the adhesive porous layer and the electrode tends to be decreased, however, the separator of the present disclosure has good adhesion to the electrode, even in the case of including the filler in the adhesive porous layer, due to the VDF-HFP copolymer included in the adhesive porous layer having the acid value of from 3.0 mgKOH/g to 20 mgKOH/g.

The content of the filler contained in the adhesive porous layer is preferably 30% by mass or more, more preferably 40% by mass or more, still more preferably 50% by mass or more of the total solid content contained in the adhesive porous layer, from the viewpoint of improving thermal resistance. Meanwhile, from the viewpoint of securing the adhesiveness to the electrode, the content of the filler is preferably 80% by mass or less, more preferably less than 80% by mass, still more preferably 75% by mass or less, still more preferably 70% by mass or less of the total solid content contained in the adhesive porous layer.

It is preferred that the average particle diameter of the filler is from 0.01 µm to 10 µm. The lower limit thereof is more preferably 0.1 µm or more, and the upper limit thereof is more preferably 5 µm or less.

It is preferred that the particle size distribution of the filler is 0.1 µm<d90−d10<3 µm, wherein d10 denotes a 10% cumulative particle diameter (µm) in the volume-based particle size distribution calculated from the small particle side; and d90 denotes a 90% cumulative particle diameter (µm) in the volume-based particle size distribution calculated from the small particle side. The particle size distribution is measured using for example, a laser diffraction type particle size distribution measuring apparatus (e.g., Mastersizer 2000, a product available from Sysmex Corporation), water as a dispersion solvent, and a non-ionic surfactant, Triton X-100 as a dispersing agent.

[Inorganic Filler]

It is preferred that the inorganic filler in the present disclosure is stable to the electrolyte solution, while being electrochemically stable. Specifically for example, metal hydroxides such as aluminum hydroxide, magnesium hydroxide, calcium hydroxide, chromium hydroxide, zirconium hydroxide, cerium hydroxide, nickel hydroxide and boron hydroxide; metal oxides such as alumina, titania, magnesia, silica, zirconia and barium titanate; carbonates such as calcium carbonate and magnesium carbonate; sulfates such as barium sulfate and calcium sulfate; clay mineral such as calcium silicate and talc, and the like may be listed. As the inorganic filler, it is preferred to include at least one of the metal hydroxides and metal oxides, and in the viewpoint of imparting flame retardancy and antistatic effect, it is preferred to include metal hydroxides, and it is more preferred to include magnesium hydroxide. These inorganic fillers may be used alone or in combination of two or more. The inorganic filler may be surface-modified by a silane coupling agent.

The particle shape of the inorganic filler is not limited, and may be a shape close to a sphere, or a plate shape, but from the viewpoint of the short circuit inhibition of the battery, the plate-shaped particles or non-agglomerated primary particles are preferred.

[Organic Filler]

As the organic filler in the present disclosure, a crosslinked acryl resin such as crosslinked methyl polymethacrylate and crosslinked polystyrene may be listed, and the crosslinked methyl polymethacrylate is preferred.

[Other Additives]

The adhesive porous layer in the present disclosure may contain an additive, for example, a dispersing agent such as a surfactant, a wetting agent, a defoamer, a pH adjusting agent or the like. The dispersing agent is added to the coating liquid for forming the adhesive porous layer, for the purpose of improving dispersibility, coatability and preservation stability. The wetting agent, defoamer and pH adjusting agent are added to the coating liquid for forming the adhesive porous layer, for example, for being well-mixed with the porous substrate, for suppressing air entrainment to the coating liquid, or for pH adjustment.

[Characteristics of Adhesive Porous Layer]

The coated amount of the adhesive porous layer is preferably from 0.5 g/m² to 5.0 g/m², more preferably from 0.75 g/m² to 4.0 g/m², on one surface of the porous substrate. When the coated amount of one surface is 0.5 g/m² or more, the adhesiveness to the electrode is good, and as a result, the cycle characteristics of the battery is better. Meanwhile, when the coated amount on one surface is 5.0 g/m² or less, ion permeability is good, and as a result, the load characteristics of the battery is excellent.

When the adhesive porous layer is provided on both surfaces of the porous substrate, the coated amount of the adhesive porous layer is preferably from 1.0 g/m² to 10.0 g/m², more preferably from 1.5 g/m² to 8.0 g/m², as the total amount on both surfaces.

When the adhesive porous layer is provided on both surfaces of the porous substrate, the difference between the coated amount on one surface and the coated amount on the other surface is preferably 20% by mass or less of the total coated amount of both surfaces. When the coated amount is 20% by mass or less, the separator is difficult to be curved, has good handling, and also has good cycle characteristics of the battery.

The adhesive porous layer has a thickness of preferably from 0.5 μm to 6 μm, on one surface of the porous substrate. When the thickness is 0.5 μm or more, the adhesiveness to the electrode is good, and as a result, the cycle characteristics of the battery is improved. In this regard, the thickness if more preferably 1 μm or more. Meanwhile, when the thickness is 6 μm or less, ion permeability is good, and as a result, the load characteristics of the battery are improved. In this regard, the thickness is preferably 5.5 μm or less, more preferably 5 μm or less.

The porosity of the adhesive porous layer is preferably from 30% to 80%, and more preferably from 30% to 60%. When the porosity is 80% or less (more preferably 60% or less), the mechanical properties to withstand the press process of adhering to the electrode may be secured, and the surface opening ratio is not unduly high, thereby being suitable for securing adhesive strength. Meanwhile, the porosity of 30% or more is preferred for good ion permeability.

The average pore diameter of the adhesive porous layer is preferably from 10 nm to 200 nm, more preferably from 20 nm to 100 nm. When the average pore diameter is 10 nm or more (preferably 20 nm or more), even in the case that the adhesive porous layer is impregnated with the electrolyte solution, and the resin contained in the adhesive porous layer swells, the clogging of the pores is unlikely to occur. Meanwhile, when the average pore diameter is 200 nm or less (preferably 100 nm or less), the non-uniformity of the open pores on the adhesive porous layer surface is suppressed, so that the bonding points are evenly scattered, thereby having better adhesiveness to the electrode. In addition, when the average pore diameter is 200 nm or less (preferably 100 nm or less), the uniformity of ionic migration is high, thereby having better cycle characteristics and load characteristics of the battery.

The average pore diameter (nm) of the adhesive porous layer is calculated by the following equation, assuming that all the pores are cylindrical:

$$d = 4V/S$$

wherein d represents the average pore diameter (diameter) of the adhesive porous layer; V represents the pore volume per 1 m² of the adhesive porous layer; and S represents the pore surface area per 1 m² of the adhesive porous layer.

The pore volume, V per 1 m² of the adhesive porous layer is calculated from the porosity of the adhesive porous layer.

The pore surface area, S per 1 m² of the adhesive porous layer is calculated as follows:

First, the specific surface area (m²/g) of the porous substrate and the specific surface area (m²/g) of the separator are calculated from nitrogen gas adsorption amount, by applying a BET equation as a nitrogen gas adsorption method. This specific surface area (m²/g) is multiplied by each of the basis weights (g/m²) to calculate each of the pore surface areas per 1 m². Further, the pore surface area per 1 m² of the porous substrate is subtracted from the pore surface area per 1 m² of the separator, thereby calculating the pore surface area, S per 1 m² of the adhesive porous layer.

[Characteristics of Separator for Non-Aqueous Secondary Battery]

The separator of the present disclosure has a thickness of preferably from 5 μm to 35 μm, more preferably from 5 μm to 30 μm, still more preferably from 10 μm to 25 μm, still more preferably from 10 μm to 20 μm, from the viewpoint of mechanical strength, energy density of a battery, and output characteristics.

It is preferred that the porosity of the separator of the present disclosure is from 30% to 60%, from the viewpoint of mechanical strength, adhesiveness to the electrode, and ion permeability.

The Gurley value of the separator of the present disclosure (JIS P8117:2009) is preferably from 50 sec/100 cc to 800 sec/100 cc, more preferably from 50 sec/100 cc to 400 sec/100 cc, from the viewpoint of good balance between mechanical strength and film resistance.

The separator of the present disclosure has the value obtained by subtracting the Gurley value of the porous substrate from the Gurley value of the separator (in a state that the adhesive porous layer is formed on the porous substrate) (hereinafter, referred to as "Gurley value difference") is preferably 300 sec/100 cc or less, more preferably 150 sec/100 cc or less, still more preferably 100 sec/100 cc or less, from the viewpoint of ion permeability. With the Gurley value difference of 300 sec/100 cc or less, the adhesive porous layer is not excessively dense, and the ion permeability is well-maintained, thereby obtaining excellent battery characteristics. Meanwhile, the Gurley value difference is preferably 0 sec/100 cc or more, and for increasing the adhesive strength between the adhesive porous layer and the porous substrate, preferably 10 sec/100 cc or more.

It is preferred that the film resistance of the separator of the present disclosure is from 1 ohm·cm² to 10 ohm·cm², from the viewpoint of the load characteristics of the battery. Herein, the film resistance refers to a resistance value when impregnating the separator with the electrolyte solution, and is measured by an alternating current method. Since the film resistance value is varied with the kind of electrolyte solution and the temperature, the value is measured at a temperature of 20° C. or less using a mixed solvent of 1 mol/L of $LiBF_4$-propylene carbonate:ethylene carbonate (mass ratio 1:1) as the electrolyte solution.

The piercing strength of the separator of the present disclosure is preferably from 250 g to 1,000 g, more preferably from 300 g to 600 g. The measurement method of the piercing strength of the separator is identical to the measurement method of the piercing strength of the porous substrate.

It is preferred that the thermal shrinkage of the separator of the present disclosure at 130° C. is 10% or less in both of MD direction and TD direction, from the viewpoint of the balance between the shape stability and the shutdown property.

It is preferred that the curvature rate of the separator of the present disclosure is from 1.5 to 2.5, from the viewpoint of ion permeability.

It is preferred that the moisture amount (by mass) contained in the separator of the present disclosure is 1000 ppm or less. As the moisture amount of the separator is smaller, when configuring the battery, the reaction of the electrolyte solution and water may be suppressed, and gas generation in the battery may be suppressed, thereby improving the cycle characteristics of the battery. In this regard, the moisture amount contained in the separator of the present disclosure is more preferably 800 ppm or less, still more preferably 500 ppm or less.

[Manufacturing Method of Separator for Non-Aqueous Secondary Battery]

The separator of the present disclosure is manufactured, for example, by coating a coating liquid containing at least the VDF-HFP copolymer on the porous substrate to form a coated layer, and then solidifying the VDF-HFP copolymer contained in the coated layer, thereby forming the adhesive porous layer on the porous substrate. Specifically, the adhesive porous layer may be formed, for example, by the following wet coating method.

The wet coating method is a film forming method to sequentially perform the following processes: (i) a coating liquid preparation process of dissolving or dispersing a VDF-HFP copolymer in a solvent to prepare the coating liquid, (ii) a coating process of coating the coating liquid on a porous substrate to form a coated layer, (iii) a solidification process of contacting the coated layer with the coagulating solution to cause phase separation, while solidifying the VDF-HFP copolymer, thereby obtaining a composite film having an adhesive porous layer on the porous substrate, (iv) a washing process of washing the composite film with water, and (v) a drying process of removing water from the composite film. The details of the wet coating method preferred for the separator of the present disclosure is as follows:

As the solvent dissolving or dispersing the VDF-HFP copolymer (hereinafter, referred to as "good solvent"), used in the preparation of the coating liquid, polar amide solvents such as N-methyl pyrrolidone, dimethylacetamide, dimethyl formamide, and dimethyl formamide are preferably used.

From the viewpoint of forming an adhesive porous layer having a good porous structure, it is preferred that a phase separating agent causing phase separation is mixed with the good solvent. As the phase separating agent, water, methanol, ethanol, propyl alcohol, butyl alcohol, butandiol, ethylene glycol, propylene glycol, tripropylene glycol, etc. may be listed. It is preferred that the phase separating agent is mixed with the good solvent within a range of securing suitable viscosity for coating.

As the solvent used in the preparation of the coating liquid, a mixed solvent containing 60% by mass or more of the good solvent, and from 5% by mass to 40% by mass of the phase separating agent is preferred, from the viewpoint of forming the adhesive porous layer having a good porous structure.

It is preferred that the concentration of the resin in the coating liquid is from 1% by mass to 20% by mass with respect to the total mass of the coating liquid, from the viewpoint of forming the adhesive porous layer having a good porous structure.

In the case of containing a filler or other components in the adhesive porous layer, the filler or other component may be dissolved or dispersed in the coating liquid.

The coating liquid may contain a dispersing agent such as a surfactant, a wetting agent, a defoamer, a pH adjusting agent, or the like. These additives may remain in the adhesive porous layer, if it is electrochemically stable and does not inhibit the reaction in the battery in the use range of the non-aqueous secondary battery.

A coagulating solution is generally composed of a good solvent used in the preparation of the coating liquid, a phase separating agent and water. It is preferred for production that the mixing ratio of the good solvent and the phase separating agent is adjusted to the mixing ratio of the mixed solvent used in the preparation of the coating liquid. It is preferred for formation of a porous structure and production that the water content of the coagulating solution is from 40% by mass to 90% by mass. By controlling the water content, the phase separation rate may be controlled, and the crystal structure of the VDF-HFP copolymer in the adhesive porous layer may be controlled.

For coating the coating liquid on the porous substrate, a conventional coating manner using a Meyer bar, a die coater, a reverse roll coater, a gravure coater, etc. may be applied. When forming the adhesive porous layer on both surfaces of the porous substrate, it is preferred to coat the coating liquid simultaneously on both surfaces of the substrate, from the viewpoint of production.

The adhesive porous layer may be prepared by a dry coating method, as well as the wet coating method as described above. The dry coating method is a method to obtain the adhesive porous layer, by coating the coating liquid containing the VDF-HFP copolymer and the solvent on the porous substrate, and drying this coated layer to remove the solvent by volatilization. However, since the coated layer is more likely to be dense by the dry coating method, as compared with the wet coating method, the wet coating method is preferred for obtaining a good porous structure.

The separator of the present disclosure may be also manufactured by the method of manufacturing the adhesive porous layer as an independent sheet, superimpose this adhesive porous layer on the porous substrate, and forming a composite by thermocompression or an adhesive. As the method of manufacturing the adhesive porous layer as an independent sheet, the method of applying a wet coating method or a dry coating method as described above, and forming the adhesive porous layer on the peeling sheet, may be listed.

<Non-Aqueous Secondary Battery>

The non-aqueous secondary battery of the present disclosure is a non-aqueous secondary battery obtaining electromotive force by lithium doping and dedoping, and has a positive electrode; a negative electrode; and the separator of the present disclosure. Doping means occlusion, supporting, adsorption or insertion, and a phenomenon in which lithium ions enter the active material of the electrode such as a positive electrode.

The non-aqueous secondary battery of the present disclosure has a structure in which, for example, a battery element having the positive electrode and the negative electrode facing each other through the separator is enclosed together with the electrolyte solution inside of the exterior material. The non-aqueous secondary battery of the present disclosure is preferred for particularly a lithium ion secondary battery.

The non-aqueous secondary battery of the present disclosure has the separator of the present disclosure having excellent adhesiveness to the electrode, thereby achieving high production yield.

Hereinafter, the exemplary forms of the positive electrode, the negative electrode, the electrolyte solution, and the exterior materials provided in the non-aqueous secondary battery of the present disclosure will be described.

The positive electrode may have a structure in which an active material layer containing the positive electrode active material and the binder resin is formed on the current collector. The active material layer may further contain a conductive aid. The example of the positive electrode active material may include a lithium-containing transition metal oxide and the like, and specifically, $LiCoO_2$, $LiNiO_2$, $LiMn_{1/2}Ni_{1/2}O_2$, $LiCo_{1/3}Mn_{1/3}Ni_{1/3}O_2$, $LiMn_2O_4$, $LiFePO_4$, $LiCo_{1/2}Ni_{1/2}O_2$, $LiAl_{1/4}Ni_{3/4}O_2$, etc. The example of the binder resin may include a polyvinylidene fluoride type resin. The example of the conductive aid may include carbon materials such as acetylene black, ketjen black, graphite powder and the like. The example of the current collector may include aluminum foil, titanium foil, stainless steel foil and the like having a thickness of from 5 μm to 20 μm.

According to an embodiment of the separator of the present disclosure, the adhesive porous layer has excellent oxidation resistance, and thus, by disposing the adhesive porous layer in the positive electrode side of the non-aqueous secondary battery, it is easy to apply $LiMn_{1/2}Ni_{1/2}O_2$, $LiCo_{1/3}Mn_{1/3}Ni_{1/3}O_2$, etc. which may be operated at high voltage of 4.2 V or more, as the positive electrode active material.

The negative electrode may have a structure in which the active material layer containing the negative electrode active material and the binder resin is formed on the current collector. The active material layer may further contain a conductive aid. As the negative electrode active material, a material capable of electrochemically occluding lithium, specifically for example, carbon materials; an alloy of lithium with silicon, tin, aluminum, etc.; and the like may be listed. As the binder resin, for example, a polyvinylidene fluoride type resin, a styrene-butadiene copolymer and the like may be listed. The example of the conductive aid may include carbon materials such as acetylene black, ketjen black, graphite powder and the like. The example of the current collector may include copper foil, nickel foil, stainless foil and the like having a thickness of from 5 μm to 20 μm. In addition, instead of the negative electrode, metal lithium foil may be used as the negative electrode.

The non-aqueous secondary battery of the present disclosure has excellent adhesion to the negative electrode using a water-based binder (specifically a styrene-butadiene copolymer), as well as the negative electrode using a solvent-based binder (specifically a polyvinylidene fluoride type resin), by applying the separator of the present disclosure.

It is preferred that the electrode contains more binder resin in the active material layer, from the viewpoint of adhesiveness to the separator. Meanwhile, from the viewpoint of increasing energy density of the battery, it is preferred to contain more active material in the active material layer, and it is preferred to contain a relatively small amount of the binder resin. Since the separator of the present disclosure has excellent adhesion to the electrode, it is possible to decrease the amount of the binder resin in the active material layer, thereby increasing the amount of the active material, and thus, increasing the energy density of the battery.

The electrolyte solution is a solution of a lithium salt dissolved in a non-aqueous solvent. The example of the lithium salt includes $LiPF_6$, $LiBF_4$, $LiClO_4$ and the like. The example of the non-aqueous solvent includes cyclic carbonates such as ethylene carbonate, propylene carbonate, fluoroethylene carbonate, difluoroethylene carbonate and vinylene carbonate; chain carbonates such as dimethyl carbonate, diethyl carbonate, ethylmethyl carbonate and a fluorine substituent thereof: cyclic esters such as γ-butyrolactone and γ-valerolactone; and the like, and these may be used alone, or in combination. As the electrolyte solution, it is preferred to mix the cyclic carbonate and the chain carbonate in a mass ratio (cyclic carbonate:chain carbonate) of from 20:80 to 40:60, and dissolve the lithium salt at from 0.5 mol/L to 1.5 mol/L.

As the exterior materials, a metal can, a pack made of an aluminum laminate film, or the like may be listed. The shape of the battery may be a square, a cylinder, a coin, or the like, but the separator of the present disclosure is preferred for any shape.

In the non-aqueous secondary battery of the present disclosure, formation of a gap between the electrode and the separator caused by expansion and contraction of the electrode due to the charge and discharge, or shock from the outside is suppressed, by excellent adhesion to the electrode of the adhesive porous layer of the separator forming the battery. Accordingly, as the separator of the present disclosure, a soft pack battery using a pack made of an aluminum laminate film as exterior materials is preferred, and according to the separator of the present disclosure, a soft pack battery having high battery performance is provided.

The non-aqueous secondary battery of the present disclosure may be manufactured for example, by any one of the following 1) to 3), using a laminate, after manufacturing the laminate in which the separator of the present disclosure is disposed between the positive electrode and the negative electrode.

1) The laminate is thermally pressed (dry heat press) to bond the electrode and the separator which is then housed in the exterior material (for example, a pack made of an aluminum laminate film, the same shall apply hereinafter), and the electrolyte solution is injected thereto to render the inside of the exterior material vacuum, and then the laminate is further thermally pressed (wet heat press) from above the exterior material, thereby bonding the electrode and the separator, and sealing the exterior material.

2) The laminate is housed in the exterior material, to which the electrolyte solution is injected to render the inside of the exterior material vacuum, and the laminate is thermally pressed (wet heat press) from above the exterior material, thereby bonding the electrode and the separator, and sealing the exterior material.

3) The laminate is thermally pressed (dry heat press) to bond the electrode and the separator, and then housed in the exterior material, and the electrolyte solution is injected thereto to render the inside of the exterior material vacuum, and then the exterior material is sealed.

According to the manufacturing method of 1), the electrode and the separator is bonded before the laminate is housed in the exterior material, and thus, the deformation of the laminate which occurs when returning the laminate for housing it in the exterior material is suppressed, and thus, the production yield of the battery is high.

In addition, according to the manufacturing method of 1), the laminate is further thermally pressed, in a state that the polyvinylidene fluoride type resin contained in the adhesive porous layer of the separator is swollen in the electrolyte solution, and thus, the adhesion between the electrode and the separator becomes firm, and the production yield of the battery is high.

In addition, the wet heat press in the manufacturing method of 1) is under the mild condition to the extent that the adhesion between the electrode and the separator, somewhat attenuated by impregnation with the electrolyte solution is recovered, that is, the temperature of the wet heat press may be set relatively low, and thus, gas generation caused by the decomposition of the electrolyte solution and the electrolyte in the battery in the manufacture of the battery is suppressed, and the cycle characteristics and the production yield of the battery is high.

According to the manufacturing method of 2), the laminate is thermally pressed in a state that the polyvinylidene fluoride type resin contained in the adhesive porous layer of the separator is swollen in the electrolyte solution, and thus, the electrode and the separator are well-bonded, and the production yield of the battery is high.

According to the manufacturing method of 3), the electrode and the separator are well-bonded before housing the laminate in the exterior material, and thus, the deformation of the laminate which occurs when returning the laminate for housing it in the exterior material is suppressed, and the production yield of the battery is high.

In addition, according to the manufacturing method of 3), gas generation caused by decomposition of the electrolyte solution and the electrolyte in the battery in the battery manufacture is suppressed by not performing wet heat press, and the production yield of the battery is high.

In addition, according to the manufacturing method of 3), adhesiveness between the separator and the electrode is not influenced by the kind of electrolyte solution, by not performing the wet heat press.

The separator of the present disclosure has excellent adhesion to the electrode by any of the wet heat press or the dry heat press, and thus, the non-aqueous secondary battery to which the separator of the present disclosure is applied has a broad range of manufacturing methods as described above. For responding to the larger area of the battery, the manufacturing method of 1) is preferred, from the viewpoint of suppressing the deformation of the laminate, and further suppressing the peeling of the electrode and the separator.

As the condition of the thermal press in the manufacturing methods of 1) to 3), the press pressure is preferably from 0.1 MPa to 15.0 MPa. and the temperature is preferably from 60° C. to 100° C., in the dry heat press and the wet heat press, respectively.

The separator of the present disclosure may be adhered by superimposing it on the electrode. Therefore, the press is not an essential process in the manufacture of the battery, but from the viewpoint of allowing the adhesion between the electrode and the separator to be firm, it is preferred to perform pressing. From the viewpoint of allowing the adhesion between the electrode and the separator to be firmer, it is preferred to perform pressing while heating the press (thermal press).

In the manufacture of the laminate, the disposition of the separator between the positive electrode and the negative electrode may be carried out in the manner of laminating the positive electrode, the separator and the negative electrode in this order by at least one layer (so called, stack manner), or in the manner of superimposing the positive electrode, the separator, the negative electrode and the separator in this order, and winding them in a longitudinal direction.

EXAMPLES

Hereinafter, the separator and the non-aqueous secondary battery of the present disclosure will be described in more detail, by the following Examples. However, the separator and the non-aqueous secondary battery of the present disclosure are not limited to the following Examples.

<Measurement Method and Evaluation Method>

The measurement method and the evaluation method applied to the Examples and Comparative Examples are as follows:

[Acid Value of Polyvinylidene Fluoride Type Resin]

The acid value of the polyvinylidene fluoride type resin was measured using a potentiometric titrator, AT-500 N (product available from Kyoto Electronics Co., Ltd.), and a composite glass electrode (product available from Kyoto Electronics Industry Co., Ltd.), based on JIS K1557-5:2007 (potentiometric titration method). The specific measurement order is as follows:

(i) To a 100 mL Erlenmeyer flask, 0.4 g of a polyvinylidene fluoride type resin and 80 mL of acetone were added, and heated with a hot water bath to dissolve the polyvinylidene fluoride type resin in acetone, thereby manufacturing a sample.

(ii) The sample was titrated using a potentiometric titrator, and the inflection point of the obtained titration curve was defined as an end point (titration solution amount in the present test). 0.02 mol/L KOH of an ethanol solution was used as a titration solution.

(iii) In the same manner, a blank test was carried out using the sample not including the polyvinylidene fluoride type resin, thereby calculating the acid value by the following Equation:

$$\text{Acid value}(\text{mgKOH/g}) = (V1-V0) \times N \times 56.1 \times f \div S$$

V1: titration solution amount (mL) in the actual test,
V0: titration solution amount (mL) in the blank test,
N: concentration of the titration solution (mol/L),
f: factor of the titration solution=0 958
S: sample amount (g) of the polyvinylidene fluoride type resin

[Proportion of HFP Unit in Polyvinylidene Fluoride Type Resin]

The proportion of the HFP unit in the polyvinylidene fluoride type resin was calculated from an NMR spectrum. Specifically, 20 mg of the polyvinylidene fluoride type resin was dissolved in 0.6 mL of heavy dimethyl sulfoxide at 100° C., and the $^{19}$F-NMR spectrum at 100° C. was measured.

[Weight-Average Molecular Weight of Polyvinylidene Fluoride Type Resin]

The weight-average molecular weight (Mw) of the polyvinylidene fluoride type resin was measured by gel permeation chromatography (GPC). The molecular weight measurement by GPC was performed by using GPC equipment, "GPC-900" available from JASCO Corporation, two TSKgel SUPER AWM-H's available from TOSOH corporation in the column, and dimethyl formamide as the solvent, under the condition of a temperature of 40° C., and a flow rate of 10 mL/min, thereby obtaining a molecular weight in terms of polystyrene.

[Film Thickness]

The film thickness of the porous substrate and the separator was measured using a contact type thickness meter (LITEMATIC, a product available from Mitutoyo Corporation). The measurement terminal having a cylindrical shape of a diameter of 5 mm was used, and during measurement, adjustment was carried out to apply 7 g of a load, and the measurement was performed at 20 points, and the average value was calculated therefrom.

[Coated Amount of Adhesive Porous Layer]

The separator was cut into a size of 10 cm×10 cm to measure the mass, and this mass was divided by the area, thereby calculating the basis weight of the separator. In addition, the porous substrate used in the manufacture of the separator was cut into a size of 10 cm×10 cm to measure the mass, and this mass was divided by the area, thereby calculating the basis weight of the porous substrate. Further, the basis weight of the porous substrate was subtracted from the basis weight of the separator, thereby calculating the total coated amount of the both surfaces of the adhesive porous layer.

[Porosity]

The porosity of each of the porous substrate and the separator was determined according to the following calculation method.

In a case in which constituent materials are a, b, c, . . . , n; the masses of each of the constituent materials are Wa, Wb, Wc, . . . , Wn (g/cm$^2$); the true densities of each of the constituent materials are da, db, dc, . . . , dn (g/cm$^3$), and the thickness is t (cm), the porosity ε (%) is determined by the following formula.

$$\varepsilon = \{1-(Wa/da+Wb/db+Wc/dc+ \ldots +Wn/dn)/t\} \times 100$$

[Gurley Value]

The Gurley value of the porous substrate and the separator was measured with a Gurley type densometer (G-B2C, a product available from TOYO SEIKI, Co., Ltd.) according to JIS P8117:2009.

[Dry Adhesive Strength to Negative Electrode]

300 g of artificial graphite as a negative electrode active material, 7.5 g of an aqueous dispersion containing 40% by mass of modified styrene-butadiene copolymer as a binder, 3 g of carboxymethyl cellulose as a thickening agent, and an appropriate amount of water were mixed by stirring with a double arm type mixer, thereby preparing slurry for a negative electrode. This slurry for a negative electrode was coated on one surface of copper foil which is the negative electrode current collector, having a thickness of 10 μm, and dried and pressed, thereby obtaining a negative electrode having a negative electrode active material layer (one surface coated).

The thus-obtained negative electrode and aluminum foil (thickness 20 μm) were cut into a size of a width of 1.5 cm and a length of 7 cm, and each separator obtained from the following Examples and Comparative Examples was cut into a size of a width of 1.8 cm and a length of 7.5 cm. The negative electrode-separator-aluminum foil were laminated in this order to manufacture a laminate, and the laminate was housed in the pack made of an aluminum laminate film. Thereafter, a vacuum sealer was used to render the inside of pack vacuum, and a thermal press was used to thermally press the laminate in the pack as a whole, thereby bonding the negative electrode and the separator. The thermal press condition was a load of 1 MPa, a temperature of 90° C., and press time of 30 seconds. Thereafter, the pack was opened to take out the laminate, and the aluminum foil was removed from the laminate to prepare a measurement sample.

The uncoated surface of the negative electrode of the measurement sample was fixed on a metal plate with a double-sided tape, and the metal plate was fixed to a lower chuck of Tensilone (STB-1225 S, a product available from A&D Company, Limited). Herein, the metal plate was fixed to the Tensilone, so that the longitudinal direction of the measurement sample is the direction of gravity. The separator was peeled at about 2 cm of the lower end from the negative electrode, the end was fixed to the upper chuck, and the tensile angle (the angle of the separator to the measurement sample) was adjusted to 180°. The separator was pulled at a tensile speed of 20 mm/min, and the load when the separator was peeled from the negative electrode was measured. The load at 10 mm to 40 mm from the start of measurement was collected at an interval of 0.4 mm. This measurement was carried out three times, and the average thereof was calculated, which was the dry adhesive strength to the negative electrode (N/15 mm, the adhesive strength between the negative electrode and the separator by dry heat press).

[Wet Adhesive Strength to Negative Electrode]

A negative electrode (one surface coated) was manufactured in the same manner as in [Dry adhesive strength to negative electrode] above. The negative electrode and aluminum foil (thickness 20 μm) were cut into a size of a width of 1.5 cm and a length of 7 cm, and each of the separators obtained in the following Examples and Comparative Examples was cut into a size of a width of 1.8 cm and a length of 7.5 cm. The negative electrode-separator-aluminum foil were sequentially laminated to manufacture a laminate, and the laminate was permeated with the electrolyte solution (1 mol/L LiBF$_4$-ethylene carbonate:propylene carbonate [mass ratio 1:1]), and housed in the pack made of an aluminum laminate film. Thereafter, a vacuum sealer was used to render the inside of pack vacuum, and a thermal press was used to thermally press the laminate in the pack as a whole, thereby bonding the negative electrode and the separator. The thermal press condition was a load of 1 MPa, a temperature of 90° C., and press time of 2 minutes. Thereafter, the pack was opened to take out the laminate, and the aluminum foil was removed from the laminate to prepare a measurement sample.

This measurement sample was used to measure the wet adhesive strength (N/15 mm, adhesive strength between the negative electrode and the separator by the wet heat press) to the negative electrode, in the same manner as in the measurement of the dry adhesive strength to the negative electrode as described above.

[Productivity of Battery]

—Manufacture of Positive Electrode—

91 g of lithium cobaltate powder as a positive electrode active material, 3 g of acetylene black as a conductive aid, and 3 g of polyvinylidene fluoride as a binder were dissolved in N-methyl-pyrrolidone so that the concentration of the polyvinylidene fluoride is 5% by mass, and stirring was performed with a double arm mixer, thereby preparing slurry for the positive electrode. This slurry for a positive electrode was coated on one surface of aluminum foil, having a thickness of 20 μm, and dried and pressed, thereby obtaining a positive electrode having a positive electrode active material layer (one surface coated).

—Manufacture of Negative Electrode—

A negative electrode (one surface coated) was manufactured in the same manner as in [Dry adhesive strength to negative electrode] above.

—Evaluation Test for Battery Manufacturing Yield—

Two of each separator (width of 108 mm) obtained in the following Examples and Comparative Examples were superimposed, and one end in the MD direction was wound on a stainless core. The positive electrode (width of 106.5 mm) welded with a lead tab between the two separators was inserted, the negative electrode (width of 107 mm) welded with a lead tab on one separator was disposed, and this laminate was wound, thereby continuously manufacturing 60 wound electrode bodies. The obtained wound electrode body was thermally pressed by the thermal press (dry heat press) (a load of 1 MPa, a temperature of 90° C., and press time of 30 seconds) to obtain a battery element. This battery element was housed in the pack made of an aluminum laminate film, permeated with the electrolyte solution, and sealed using a vacuum sealer. As the electrolyte solution, 1 mol/L $LiPF_6$-ethylene carbonate:ethylmethyl carbonate (mass ratio of 3:7) was used. Thereafter, the pack made of an aluminum laminate film housing the battery element and the electrolyte solution was thermally pressed (wet heat press) by the thermal press (a load of 1 MPa, a temperature of 90° C., and press time of 2 minutes), thereby obtaining 60 secondary batteries for test.

60 secondary batteries for test were charged and discharged for 100 cycles. In this test, the charge was performed at a constant current and a constant voltage of 0.5 C and 4.2 V, and the discharge was performed at a constant current of 0.5 C and a 2.75 V cutoff. The thickness of the secondary battery for test was measured before and after the cycle test, and the battery having the change of 5% or less was determined to be acceptable, and the battery not corresponding thereto was determined to be failed. Further, the proportion (%) of the number of accepted secondary batteries for test was calculated, and classified as follows:

A: the proportion of the number of accepted batteries is 100%.
B: the proportion of the number of accepted batteries is from 95% to less than 100%.
C: the proportion of the number of accepted batteries is less than 95%.

[Cycle Characteristics (Capacity Retention)]

In the above cycle test, a discharge capacity was measured, and the discharge capacity at 100th cycle was divided by the discharge capacity at 1st cycle, and additionally, the 60 values were averaged, thereby obtaining the capacity retention (%).

Manufacture of Separator

Example 1

2.4 mol % of a VDF-HFP copolymer (weight-average molecular weight of 1,130,000, a proportion of the HFP unit (with respect to the total amount of the VDF unit and the HFP unit, the same shall apply hereinafter), and an acid value of 12.6 mgKOH/g) was dissolved in a solvent (dimethylacetamide:tripropylene glycol=80:20 [mass ratio]) so that the resin concentration is 5% by mass, thereby preparing a coating liquid. The coating liquid was coated on both surfaces of the polyethylene microporous film (a film thickness of 9 μm, porosity of 40%. Gurley value of 152 sec/100 cc) which is the porous substrate, and immersed in a coagulating solution (dimethylacetamide:tripropylene glycol:water=30:8:62 [mass ratio], a temperature of 40° C.) to be solidified. Subsequently, this was washed with water and dried, thereby obtaining a separator having an adhesive porous layer formed on both surfaces of the polyethylene microporous film.

Example 2

A separator having an adhesive porous layer formed on both surfaces of the polyethylene microporous film was manufactured in the same manner as in Example 1, except that to the coating liquid, magnesium hydroxide (KISUMA 5P, a product available from Kyowa Chemical Industry Co., Ltd., an average particle diameter of 0.8 μm, a BET specific surface area of 6.8 m$^2$/g) as a filler was further added, and stirring was performed until the liquid is uniform, thereby preparing a coating liquid having a mass ratio of the resin and magnesium hydroxide of 30:70.

Example 3

A separator having an adhesive porous layer formed on both surfaces of the polyethylene microporous film was manufactured in the same manner as in Example 2, except that the VDF-HFP copolymer was changed to another VDF-HFP copolymer (a weight-average molecular weight of 1,080,000, a proportion of the HFP unit of 3.1 mol %, an acid value of 10.5 mgKOH/g).

Example 4

A coating liquid was prepared in the same manner as in Example 2, except that the VDF-HFP copolymer was changed to another VDF-HFP copolymer (a weight-average molecular weight of 1,000,000, a proportion of the HFP unit of 4.1 mol %, an acid value of 7.4 mgKOH/g), and the mass ratio of the resin and magnesium hydroxide was changed to 40:60. The coating liquid was coated on both surfaces of the polyethylene microporous film (a film thickness of 6 μm, porosity of 35%, Gurley value of 127 sec/100 cc) which is the porous substrate, and immersed in a coagulating solution (dimethylacetamide:tripropylene glycol:water=30:8:62 [mass ratio], a temperature of 40° C.) to be solidified. Subsequently, this was washed with water and dried, thereby manufacturing a separator having an adhesive porous layer formed on both surfaces of the polyethylene microporous film.

Example 5

A separator having an adhesive porous layer formed on both surfaces of the polyethylene microporous film was manufactured in the same manner as in Example 1, except that the VDF-HFP copolymer was changed to another VDF-HFP copolymer (a weight-average molecular weight of 900,000, a proportion of the HFP unit of 5.2 mol %, an acid value of 3.7 mgKOH/g).

Example 6

A separator having an adhesive porous layer formed on both surfaces of the polyethylene microporous film was manufactured in the same manner as in Example 1, except that the VDF-HFP copolymer was changed to another VDF-HFP copolymer (a weight-average molecular weight of 330,000, a proportion of the HFP unit of 4.8 mol %, an acid value of 19.0 mgKOH/g).

Example 7

A separator having an adhesive porous layer formed on both surfaces of the polyethylene microporous film was manufactured in the same manner as in Example 1, except that the VDF-HFP copolymer was changed to another VDF-HFP copolymer (a weight-average molecular weight of 400,000, a proportion of the HFP unit of 2.4 mol %, an acid value of 12.6 mgKOH/g).

Example 8

A separator having an adhesive porous layer formed on both surfaces of the polyethylene microporous film was manufactured in the same manner as in Example 1, except that the VDF-HFP copolymer was changed to another VDF-HFP copolymer (a weight-average molecular weight of 2,000,000, a proportion of the HFP unit of 2.4 mol %, an acid value of 12.6 mgKOH/g).

Example 9

A separator having an adhesive porous layer formed on both surfaces of the polyethylene microporous film was manufactured in the same manner as in Example 1, except that the VDF-HFP copolymer was changed to another VDF-HFP copolymer (a weight-average molecular weight of 400,000, a proportion of the HFP unit of 0.1 mol %, an acid value of 12.6 mgKOH/g).

Example 10

A separator having an adhesive porous layer formed on both surfaces of the polyethylene microporous film was manufactured in the same manner as in Example 1, except that the VDF-HFP copolymer was changed to another VDF-HFP copolymer (a weight-average molecular weight of 1,130,000, a proportion of the HFP unit of 10.0 mol %, an acid value of 12.6 mgKOH/g).

Comparative Example 1

A separator having an adhesive porous layer formed on both surfaces of the polyethylene microporous film was manufactured in the same manner as in Example 1, except that the VDF-HFP copolymer was changed to another polyvinylidene fluoride type resin (a weight-average molecular weight of 1,130,000, a proportion of the HFP unit of 0.0 mol %, an acid value of 9.7 mgKOH/g).

Comparative Example 2

A separator having an adhesive porous layer formed on both surfaces of the polyethylene microporous film was manufactured in the same manner as in Example 1, except that the VDF-HFP copolymer was changed to another VDF-HFP copolymer (a weight-average molecular weight of 860,000, a proportion of the HFP unit of 5.7 mol %, an acid value of 2.1 mgKOH/g).

Comparative Example 3

A separator having an adhesive porous layer formed on both surfaces of the polyethylene microporous film was manufactured in the same manner as in Example 1, except that the VDF-HFP copolymer was changed to another VDF-HFP copolymer (a weight-average molecular weight of 1,200,000, a proportion of the HFP unit of 3.0 mol %, an acid value of 2.0 mgKOH/g).

Each of the VDF-HFP copolymers used in the above Examples and Comparative Examples is a copolymer having an acid value adjusted by using the VDF unit as the main monomer unit, and defining the proportion of the HFP unit as each proportion as described above, thereby copolymerizing the monomer having a carboxyl group.

The physical properties and the evaluation results for each of the separators from Examples 1-10 and Comparative Examples 1-3 are shown in the following Table 1.

TABLE 1

| | Polyvinylidene fluoride type resin | | | Filler | | Porous substrate | Adhesive porous layer | Physical properties of separator |
|---|---|---|---|---|---|---|---|---|
| | Acid value [mgKOH/g] | Proportion of HFP unit [mol %] | Mw | Type | Fiber content [% by mass] | Film thickness [μm] | Coated amount [g/m$^2$] | Film thickness [μm] |
| Example 1 | 12.6 | 2.4 | 1,130,000 | — | 0 | 9 | 2.1 | 13.0 |
| Example 2 | 12.6 | 2.4 | 1,130,000 | Mg(OH)$^2$ | 70 | 9 | 6.4 | 18.5 |
| Example 3 | 10.5 | 3.1 | 1,080,000 | Mg(OH)$^2$ | 70 | 9 | 6.6 | 18.5 |
| Example 4 | 7.4 | 4.1 | 1,000,000 | Mg(OH)$^2$ | 60 | 6 | 3.4 | 10.5 |
| Example 5 | 3.7 | 5.2 | 900,000 | — | 0 | 9 | 2.1 | 13.0 |
| Example 6 | 19.0 | 4.8 | 330,000 | — | 0 | 9 | 2.1 | 13.0 |
| Example 7 | 12.6 | 2.4 | 400,000 | — | 0 | 9 | 2.1 | 13.0 |
| Example 8 | 12.6 | 2.4 | 2,000,000 | — | 0 | 9 | 2.1 | 13.0 |
| Example 9 | 12.6 | 0.1 | 400,000 | — | 0 | 9 | 2.1 | 13.0 |
| Example 10 | 12.6 | 10.0 | 1,130,000 | — | 0 | 9 | 2.1 | 13.0 |
| Comparative Example 1 | 9.7 | 0.0 | 1,130,000 | — | 0 | 9 | 2.1 | 13.4 |
| Comparative Example 2 | 2.1 | 5.7 | 860,000 | — | 0 | 9 | 2.1 | 13.2 |
| Comparative Example 3 | 2.0 | 3.0 | 1,200,000 | — | 0 | 9 | 2.6 | 12.2 |

TABLE 1-continued

|  | Physical properties of separator | | Dry adhesive strength to negative electrode [N/15 mm] | Wet adhesive strength to negative electrode [N/15 mm] | Productivity of battery | Cycle characteristics (capacity retention) [%] |
|---|---|---|---|---|---|---|
|  | Porosity [%] | Gurley value [s/100 cc] | | | | |
| Example 1 | 46 | 230 | 0.197 | 0.047 | A | 96 |
| Example 2 | 53 | 215 | 0.072 | 0.042 | A | 96 |
| Example 3 | 52 | 210 | 0.062 | 0.027 | A | 95 |
| Example 4 | 50 | 166 | 0.065 | 0.026 | A | 95 |
| Example 5 | 46 | 226 | 0.144 | 0.021 | B | 92 |
| Example 6 | 46 | 227 | 0.168 | 0.043 | A | 94 |
| Example 7 | 46 | 228 | 0.193 | 0.042 | A | 94 |
| Example 8 | 46 | 231 | 0.159 | 0.057 | A | 95 |
| Example 9 | 46 | 232 | 0.142 | 0.034 | A | 94 |
| Example 10 | 46 | 229 | 0.188 | 0.044 | A | 95 |
| Comparative Example 1 | 47 | 223 | 0.044 | 0.001 | C | 86 |
| Comparative Example 2 | 48 | 194 | 0.138 | 0.002 | C | 87 |
| Comparative Example 3 | 42 | 204 | 0.045 | 0.001 | C | 88 |

In Comparative Example 1 using the polyvinylidene fluoride type resin not having the HFP unit, the dry adhesive strength to the negative electrode and the wet adhesive strength to the negative electrode were both weak.

In Comparative Example 2 using the VDF-HFP copolymer having a weight-average molecular weight and a proportion of the HFP unit which are in a medium degree, and an acid value of less than 3.0, the wet adhesive strength to the negative electrode was weak.

In Comparative Example 3 using the VDF-HFP copolymer having an acid value of less than 3.0, the dry adhesive strength to the negative electrode and the wet adhesive strength to the negative electrode were both weak.

Example 1 and Example 10, Example 7 and Example 9, and Example 1, Example 7 and Example 8 were compared, respectively, and taken together (the VDF-HFP copolymers in these Examples have the same acid value), the dry adhesive strength to the negative electrode, and the wet adhesive strength to the negative electrode are not much changed even with the change in the weight-average molecular weight of the VDF-HFP copolymer, or the proportion of the HFP unit, and thus, it is recognized therefrom that the acid value of the VDF-HFP copolymer is an important factor.

The disclosure of Japanese Patent Application No. 2015-221600 filed on Nov. 11, 2015 is incorporated herein by reference in its entirety. The disclosure of Japanese Patent Application No. 2015-221601 filed on Nov. 11, 2015 is incorporated herein by reference in its entirety. The disclosure of Japanese Patent Application No. 2015-221602 filed on Nov. 11, 2015 is incorporated herein by reference in its entirety. The disclosure of Japanese Patent Application No. 2015-234796 filed on Dec. 1, 2015 is incorporated herein by reference in its entirety.

All documents, patent applications, and technical standards described in this specification are incorporated herein by reference to the same extent as if each individual document, patent application, and technical standards were specifically and individually indicated to be incorporated herein by reference.

The invention claimed is:

1. A separator for a non-aqueous secondary battery, comprising:
   a porous substrate; and
   an adhesive porous layer that is provided on one side or both sides of the porous substrate,
   wherein the adhesive porous layer contains a polyvinylidene fluoride type resin including a vinylidene fluoride monomer unit and a hexafluoropropylene monomer unit, and the polyvinylidene fluoride type resin has an acid value of from 3.0 mgKOH/g to 20 mgKOH/g.

2. The separator for a non-aqueous secondary battery according to claim 1, wherein the polyvinylidene fluoride type resin contains the hexafluoropropylene monomer unit in a range of from 0.1 mol% to 10 mol% with respect to a total amount of the vinylidene fluoride monomer unit and the hexafluoropropylene monomer unit.

3. The separator for a non-aqueous secondary battery according to claim 1, wherein a weight-average molecular weight of the polyvinylidene fluoride type resin is from 300,000 to 3,000,000.

4. The separator for a non-aqueous secondary battery according to claim 1, wherein the adhesive porous layer further contains a filler.

5. A non-aqueous secondary battery, comprising:
   a positive electrode,
   a negative electrode, and
   the separator for a non-aqueous secondary battery according to claim 1, disposed between the positive electrode and the negative electrode, wherein an electromotive force is obtained by lithium doping and dedoping.

6. The separator for a non-aqueous secondary battery according to claim 1, wherein the polyvinylidene fluoride type resin has an acid value of from 5.0 mgKOH/g to 20 mgKOH/g.

7. The separator for a non-aqueous secondary battery according to claim 1, wherein a VDF-HFP copolymer having an acid value of from 3.0 mgKOH/g to 20 mgKOH/g accounts for 95% by mass or more of a total amount of resins included in the adhesive porous layer.

* * * * *